Figure 1:
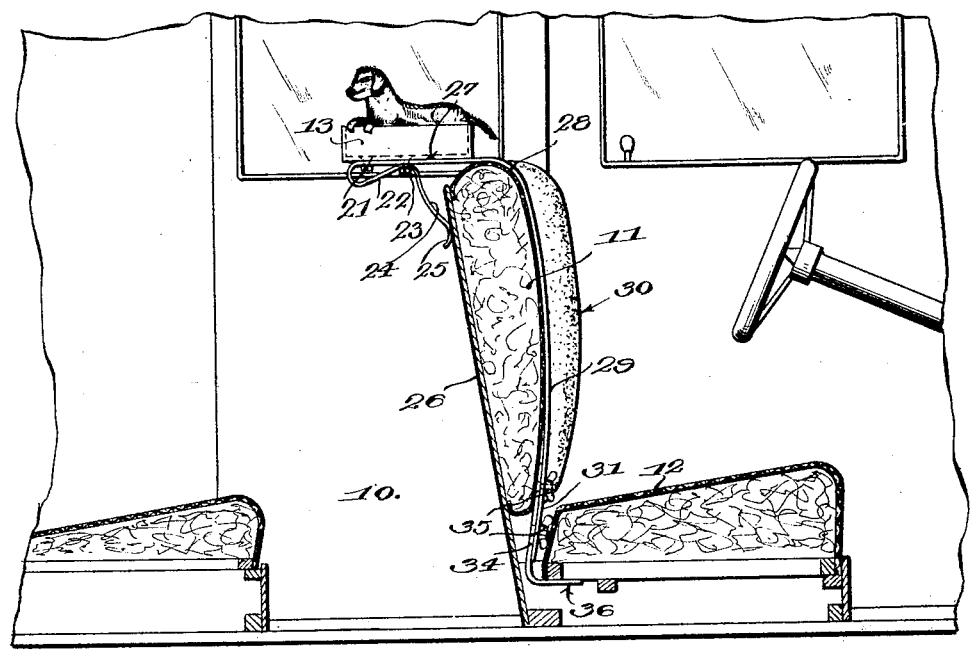

June 6, 1933. E. F. CURTIS ET AL 1,912,514
DEVICE FOR SUPPORTING ANIMALS
Filed Aug. 15, 1931

WITNESS
J P Markey

INVENTOR
E. F. Curtis and
Martha A. Curtis
BY
ATTORNEY

Patented June 6, 1933

1,912,514

UNITED STATES PATENT OFFICE

ERNEST F. CURTIS AND MARTHA A. CURTIS, OF ORLANDO, FLORIDA

DEVICE FOR SUPPORTING ANIMALS

Application filed August 15, 1931. Serial No. 557,354.

This invention relates to a device for supporting animals in automobiles.

An object of the invention is the provision of a tray which may be readily applied to the back portion of the front seat of an automobile and which may be removed at will.

Another object of the invention is the provision of a support for animals including a tray with straps secured to the bottom of the tray intermediate the ends, one portion of the strap extending downwardly from the bottom of the tray and having its free end engaging the rear face of the back portion of the front seat, the remaining portion of the strap extending over the front face of the back portion downwardly and provided with an angular portion engaged beneath the usual cushion of the seat.

A further object of the invention is the provision of a tray for supporting animals in an automobile rearwardly of the back portion of the front seat, straps being secured intermediate their ends to the bottom of the tray with a portion of each extending downwardly and engaging the rear face of the back portion of the seat, the remaining portion of each strap extending over the front face of the back portion of the seat and downwardly with adjustable means engaging beneath the usual cushion for drawing the portions of the strap in rigid engagement with the rear and front face of the back portion of the seat so that the tray will be securely held in place.

This invention will be best understood from a consideration of the following detailed description, in view of the accompanying drawing forming a part of the specification; nevertheless, it is to be understood that the invention is not confined to the disclosure, being susceptible of such changes and modifications which shall define no material departure from the salient features of the invention as expressed in the appended claim.

Figure 2:
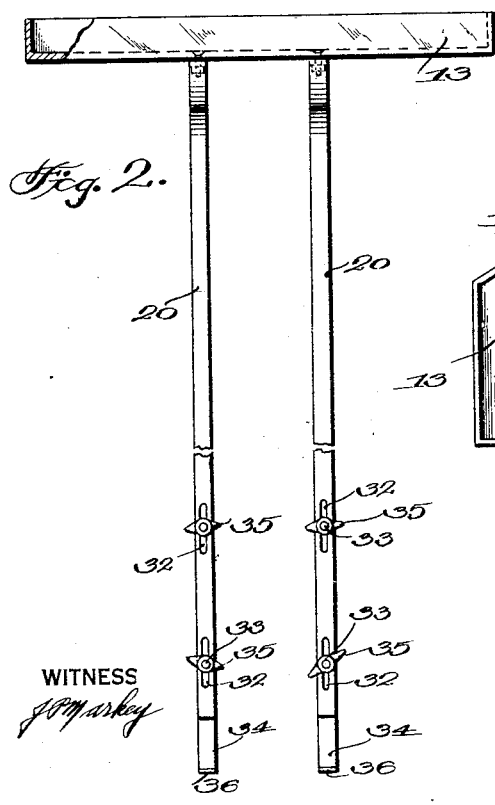
Figure 3:
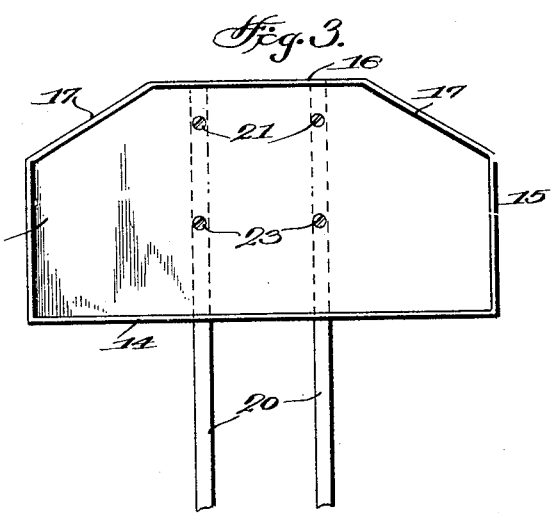

In the drawing:

Figure 1 is a longitudinal vertical section of an automobile showing our invention applied to the front seat, Figure 2 is a front view in elevation of the supporting tray and securing straps, the tray being partly in section, and Figure 3 is a top plan view of the tray.

Referring more particularly to the drawing, 10 designates an automobile having a front seat provided with a back portion 11 and a removable cushion 12.

A tray or box 13 which is adapted to support an animal at the rear of the back portion 11 of the seat has its front and side portions 14 and 15, respectively, substantially straight, the rear portion of the tray having a straight portion 16 and inwardly inclined portions 17.

A pair of straps 20 have intermediate portions secured, as shown at 21, to the bottom of the tray 13. One portion of each strap is shown at 22 and is returned upon the strap and extended forwardly, and a bolt 23 secures the portion 22 and likewise the strap directly to the bottom of the tray. The free portion 24 of the strap extends forwardly and downwardly and has a curved member 25 engaging the rear face 26 of the back portion 11 of the seat.

The other or remaining portions of the straps extend forwardly in flat contact with the bottom of the tray, as shown at 27 and then over the top portion of the seat, as at 28. These straps are carried downwardly at 29 in flat contact with the front face 30 of the seat and below the rear portion of the cushion 12, as shown at 31. Slots 32 are formed in the portion 31 of each strap to receive threaded bolts 33 which are secured to an auxiliary strap member 34. Wing nuts 35 are threaded onto the bolts 33 for securing the auxiliary strap 34 to the lower end 31 of said straps. It will be noted that by reason of the slots 32 the auxiliary straps 34 may be adjusted longitudinally of the portions 31 of the straps.

An angular offset member 36 extends forwardly and at an angle to each auxiliary strap 34 and is engaged beneath the bottom of the cushion 31.

The tray 13 is placed in position at the rear of the back portion 11 of the front seat with the members 25 engaging the rear face 26 of the back portion 11. The other portions of the straps, as indicated at 29, are brought down over the front face of the back portion 11 and when the cushion 12 is in position to engage the angular offset portions 36 of the strap the portions 29 are drawn downwardly while forcing the members 25 in rigid engagement with the rear portion 26 of the back portion 11 of the seat. In this manner the tray 13 will be rigidly clamped in position on the back portion of the seat.

We claim:

A device for supporting animals and adapted to be applied to the back of a seat of an automobile comprising a tray, metal straps bent intermediate the ends to provide a loop in each strap, means for securing each looped portion to the bottom of the tray, one free portion of the straps extending from each loop and being longer than the remaining portion, the longer portion being bent and adapted to engage over the front portion of the back of a seat of an automobile, the free end of the longer portion being bent at substantially right angles to the body of the longer portion and adapted for engagement beneath the cushion of the front seat, the shorter portion having a curved end adapted to engage the rear face of the front seat, the curved end of the shorter portion of the strap cooperating with the longer portion for aiding in clamping and securing the tray to the back of the seat of an automobile, said loops and said longer portions supporting the tray rearwardly from the front seat of the automobile.

ERNEST F. CURTIS.
MARTHA A. CURTIS.